US005370358A

United States Patent [19]

Hunter et al.

[11] Patent Number: 5,370,358

[45] Date of Patent: Dec. 6, 1994

[54] DEVICE FOR RESTRICTING FLOW AND REDUCING NOISE

[75] Inventors: Donald W. Hunter, Guntersville, Ala.; Kenneth R. Pint, Daytona Beach, Fla.

[73] Assignee: Technical Manufacturing Products, Inc., Jasper, Ga.

[21] Appl. No.: 923,547

[22] Filed: Aug. 3, 1992

[51] Int. Cl.$^5$ ............................ F16K 3/32; F01N 7/08

[52] U.S. Cl. .................................... 251/208; 251/297; 181/265

[58] Field of Search ................. 251/208, 297; 181/265

[56] References Cited

U.S. PATENT DOCUMENTS

| | | | |
|---|---|---|---|
| 1,514,441 | 11/1924 | Culp | 181/265 X |
| 1,751,591 | 3/1930 | McCloskey | 251/208 |
| 2,968,474 | 1/1961 | Eichelman et al. | 251/208 X |
| 2,999,512 | 9/1961 | Barkow | 251/208 X |
| 4,122,914 | 10/1978 | Suyama | 181/265 X |
| 4,366,947 | 1/1983 | Voege | 251/206 |

*Primary Examiner*—Arnold Rosenthal

*Attorney, Agent, or Firm*—Pettis & McDonald

[57] ABSTRACT

A device for restricting flow of fluids and reducing noise that minimizes filling losses and muffles the vent noise, for example, while gravity filling cryogenic cylinders from a storage tank. The filling loss reducer part of this device is comprised of valve body, rotor, valve seat, o-ring, springs, and ball bearings. The noise muffler is comprised of a cylinder with tubes inside it. The loss reducer and muffler are assembled together to form the device. In operation, when filling cryogenic cylinders, for example, the device is screwed on to the vent valve of the cryogenic cylinder being filled. During the fill process, vent gases from the cryogenic cylinder pass through an orifice in the device. The size of the orifice can be changed to any one of the multiple discrete sizes by manually turning the rotor. This manipulation of the orifice size changes the pressure difference between the storage tank and the cryogenic cylinder. In this example, the filling losses are substantially reduced when approximately 15 psig pressure difference is maintained between the storage tank and the cryogenic cylinder.

2 Claims, 3 Drawing Sheets

DEVICE FOR RESTRICTING FLOW AND REDUCING NOISE

BACKGROUND OF THE INVENTION

1. Field of the Invention

Liquified gases such as oxygen, nitrogen, argon, or carbon dioxide are stored and transported in insulated cryogenic cylinders. These cylinders are filled and refilled from insulated storage tanks. The present invention relates to a device for reducing filling losses and vent noise, for example, while gravity filling cryogenic cylinders from a storage tank. The device is small and light weight and is easily assembled or disassembled to or form cryogenic cylinders.

2. Description of the Prior Art

There are a number of methods for filling cryogenic cylinders from a storage tank. Most such methods incur filling losses in the range of 10% to 30% of product being filled. Several prior art systems have attempted to reduce these filling losses. These prior art systems are elaborate, comparatively expensive, and not satisfactory. Most of these use pumps for the filling process such as top filling with pumps, and recirculating systems. Another method uses an automatic throttling valve and pressure sensor to maintain system pressure close to the pressure of liquid in the storage tank.

For top filling with pumps to work effectively, the cryogenic cylinder as well as the lines and plumbing between storage tank and cryogenic cylinder needs to be cold. This means that cylinders left empty for some time can not be used effectively. Additional issues would be those of pump maintenance and need for periodic blow downs of cylinders in order to maintain pump prime.

The recirculating system uses a pump and recirculates the flashed vapor back to a storage tank. There is the potential of contaminating the storage tank if a contaminated liquid cylinder is being filled. Here again, higher pump maintenance is expected.

The system with an automatic throttling valve uses a pressure sensor for sensing the vapor pressure in the storage tank. This sensed vapor pressure of the storage tank is communicated to the automatic throttling valve which permits the vapor from the cylinder to vent to the atmosphere at a preset pressure differential. Again, this system is complex and expensive.

SUMMARY OF THE INVENTION

The present invention is intended to eliminate the above mentioned drawbacks with conventional elaborate systems, and remarkably small size and to be of a simple structure. The present invention essentially comprises a discretely variable orifice valve with a noise muffler. This device is screwed on to the vent valve of the cryogenic cylinder being filled. During the filling process, the orifice valve is normally adjusted to a setting selected by a predetermined pressure difference.

Thus, it is an object of the present invention to provide a device for reducing filling losses and vent noise which is easily installed and operated.

A further object of the present invention is to provide a device for reducing filling losses and vent noise which is designed in a very small size and light weight.

A further object of the present invention is to provide a device for reducing filling losses and vent noise which is inexpensive to manufacture.

Other objects and advantageous features of the present invention will be obvious from the following description with reference to the accompanying drawings which form a part of the invention.

BRIEF DESCRIPTION OF THE ACCOMPANYING DRAWINGS

DETAILED DESCRIPTION OF THE PREFERRED EMBODIMENTS OF THE INVENTION

Figure 1:
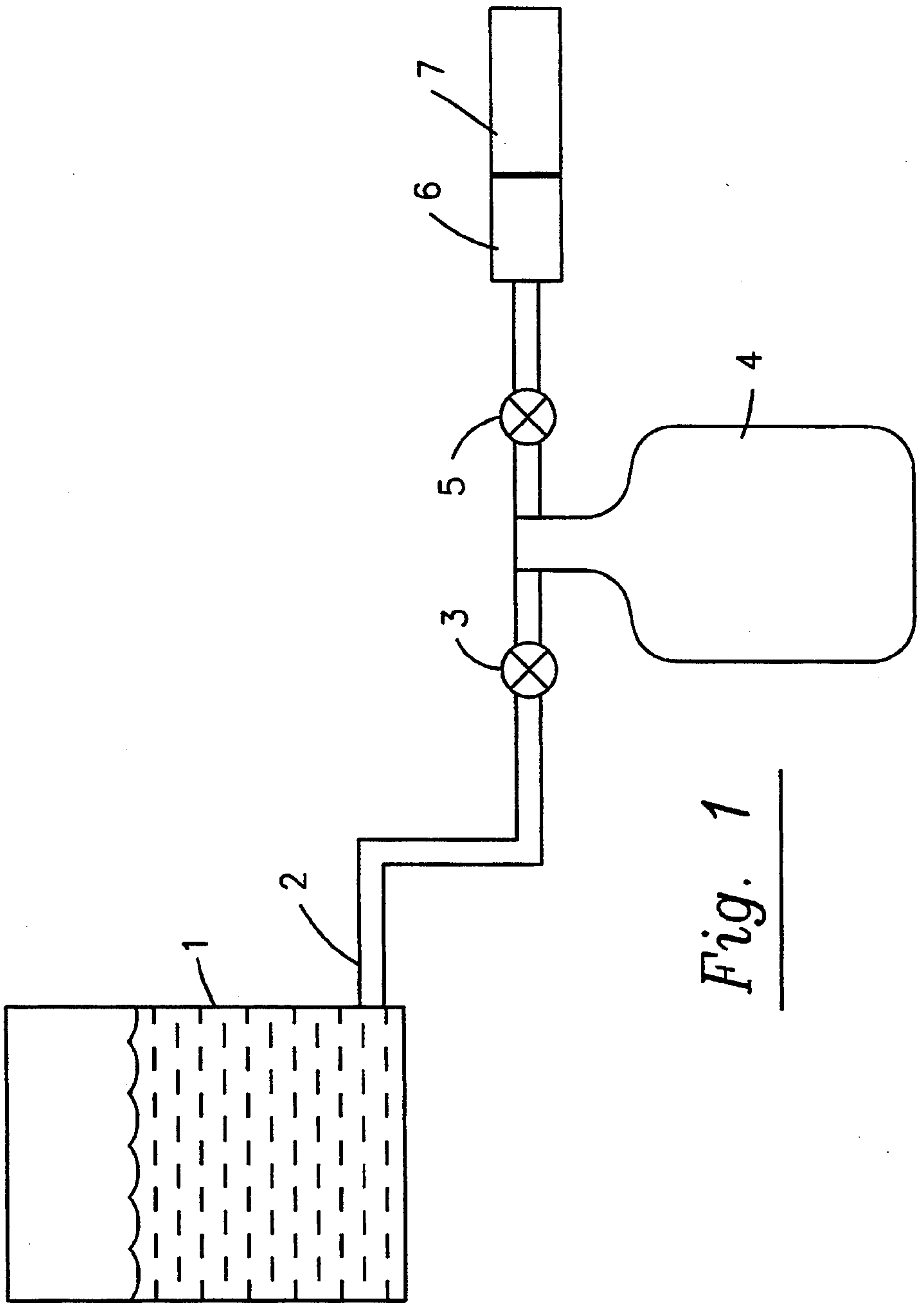
FIG. 1 is a schematic drawing of the storage tank, cryogenic cylinder, fill line, and the present invention.

FIG. 1 shows the major components of the gravity filling process of cryogenic cylinders with the present invention attached to the cylinder. As shown in FIG. 1, the storage tank 1 is connected to the cryogenic cylinder 4 by means of a fill line 2 which is connected to the fill valve 3 of the cryogenic cylinder 4. The present invention consisting of orifice valve 6 and noise muffler 7 is screwed on to the vent valve 5 of the cryogenic cylinder 4.

Figure 2:
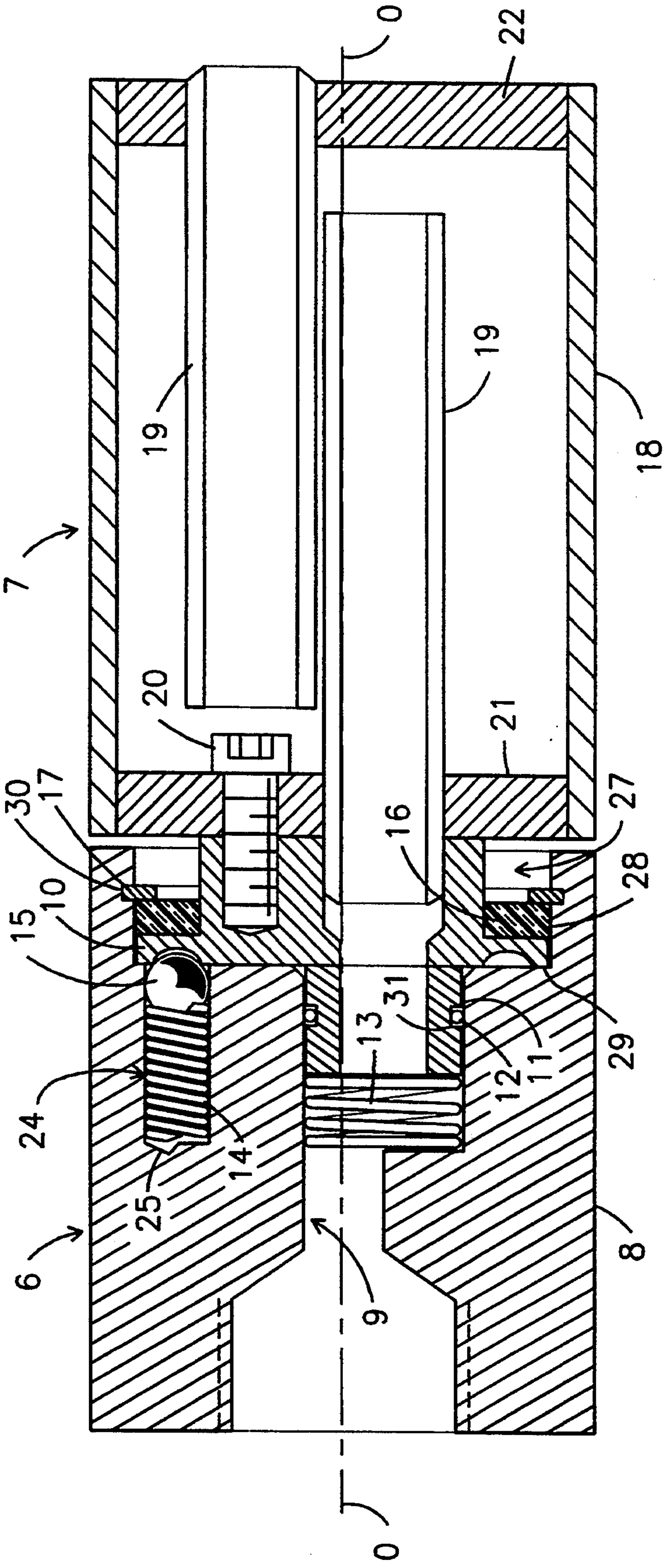
FIG. 2 is a cross sectional view of the present invention.

FIG. 2 shows the cross sectional view of the present invention. As shown in this FIG. 2, the o-ring 12 is assembled to the valve seat 11, and then this valve seat and o-ring assembly along with the main spring 13 are placed in orifice 9 of the valve body 8. The ball springs 14 are assembled to the valve body 8 and balls 15 are placed on top of the ball springs 14. The washer 16 is assembled to the rotor 10, and then this washer and rotor assembly is assembled to the valve body 8. A snap ring 17 is assembled to the valve body 8. The snap ring engages the wall 28 to form a seal, and sits in groove 30. All of these parts assembled as described above form the orifice valve 6 shown in FIG. 1. The muffler tubes 19 are assembled and joined to the end caps 21 and 22. The end caps 21 and 22 with the muffler tubes 19 are assembled to the muffler cylinder 18 which forms the noise muffler 7 shown in FIG. 1. The orifice valve 6 fits into the orifice 27. The orifice valve 6 and noise muffler 7 are assembled together by screw 20 to form the present invention.

Figure 3C:
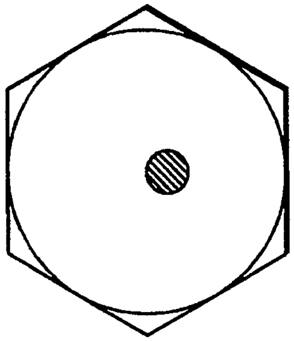
FIG. 3 shows three of the several opening sizes of the orifice.
Figure 3B:
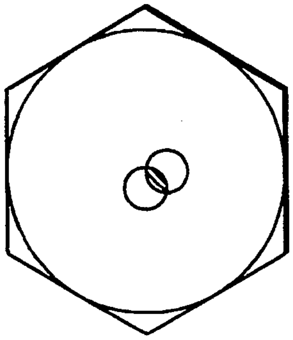
Figure 3A:
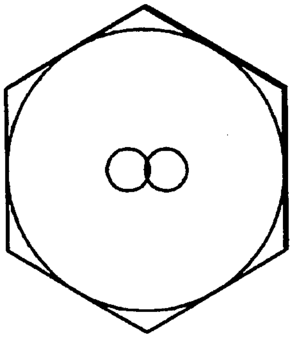

The line o-o in FIG. 2 forms an axis of rotation for adjusting means, such as rotor 10 through noise muffler 7. Several discrete rotational positions of rotor 10 are accomplished with the help of ball bearings 15 and detents in rotor 10 which align with the ball bearings 15 at certain points during rotation of the rotor 10. The ball bearing springs 14 are placed in ball bearing spring cavities 24 resting against the cavity bases 25. The rotor 10 and valve seat 11 form an opening of several discretely variable sizes. FIG. 3 shows three of the several sizes of openings. The cross-hatched areas in parts 3.1, 3.2, and 3.3 of FIG. 3 indicate sizes of the opening. Thus, by manually turning the rotor 10 to any of the discrete positions, a repeatable, settable restrictive flow path is obtained. The restriction range can be varied by opening diameter and the offset from centerline dimension. The number of settings and their spacings are controlled by the number and positions of detents in rotor 10.

In operation, cryogenic cylinder 4 is connected to storage tank 1 through fill line 2. The vent valve 5 is opened to vent off any pressure. The present invention consisting of orifice valve 6 and noise muffler 7 is screwed on to vent valve 5 of cryogenic cylinder 4. Pressure setting of storage tank 1 is recorded, fill valve 3 is opened to start the fill process. The rotor 10 is rotated by manually turning the noise muffler 7 to a setting and pressure of cryogenic cylinder 4 is checked against recorded pressure of storage tank 1. These rotations of rotor 10 are continued until the pressure of cryogenic cylinder 4 is approximately 15 psig less than that of storage tank 1. This setting of present invention at which 15 psig pressure difference is reached will substantially reduce filling losses. This same setting of the present invention can be used to fill several consecutive cryogenic cylinders as long as the storage tank pressure is not changed. In normal use, the pressure of the storage tank does not vary significantly from day to day; and therefore, continuous sensing of storage tank pressure does not compensate for the expense and complexity of such continuous sensing. Thus, the small sized and relatively inexpensive present invention is very advantageous.

The present invention is equally applicable to liquid fluids as it is to gaseous fluids.

It will be readily understood that the above described embodiments are merely illustrative of the invention and various modifications and changes could be made without any departure from the scope and the spirit of the invention.

Thus, the scope of the invention is not limited by the above detailed description, but will be indicated by the following claims.

What is claimed is:

1. An apparatus for restricting flow of fluids therethrough comprising:

an orifice valve comprising a valve body comprising an axis of rotation, said valve body having a generally cylindrical orifice extending along said axis of rotation into said valve body, said orifice ending in a base from which a tube extends through said valve body along said axis of rotation, said orifice comprising a wall;

adjusting means having a plurality of discrete rotational positions about said axis of rotation, said adjusting means fitting inside said orifice; and sealing means assembled to said adjusting means and engaging said orifice wall; and a noise muffler assembled to said adjusting means.

2. The apparatus for restricting flow of fluids of claim 1 further comprising a valve seat placed in said tube, such that an opening is formed for fluid passage therethrough between said valve seat and said adjusting means, said opening having a size controlled by said rotational positions of said adjusting means, such that the flow of fluids is controlled by said size.

* * * * *